(12) United States Patent
Wu et al.

(10) Patent No.: US 8,874,548 B2
(45) Date of Patent: Oct. 28, 2014

(54) PREDICTING QUERY EXECUTION TIME

(71) Applicant: NEC Laboratories America, Inc., Princeton, NJ (US)

(72) Inventors: Wentao Wu, Madison, WI (US); Yun Chi, Monte Sereno, CA (US); Shenghuo Zhu, Santa Clara, CA (US); Junichi Tatemura, Morrisville, PA (US); Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 94 days.

(21) Appl. No.: 13/711,023

(22) Filed: Dec. 11, 2012

(65) Prior Publication Data

US 2013/0226903 A1    Aug. 29, 2013

Related U.S. Application Data

(60) Provisional application No. 61/603,565, filed on Feb. 27, 2012.

(51) Int. Cl.
*G06F 17/30* (2006.01)
*G06F 7/00* (2006.01)

(52) U.S. Cl.
CPC .... *G06F 17/30474* (2013.01); *G06F 17/30463* (2013.01)
USPC .......................................... 707/719

(58) Field of Classification Search
CPC ................... G06F 17/30463; G06F 17/30433; G06F 17/30474; G06F 17/30445; G06F 17/30595; G06F 17/30306; G06F 17/30424; G06F 17/3048
USPC ................................. 707/718, 719
See application file for complete search history.

(56) References Cited

U.S. PATENT DOCUMENTS

| | | | | |
|---|---|---|---|---|
| 5,412,806 | A | * | 5/1995 | Du et al. ............................ 1/1 |
| 5,608,904 | A | * | 3/1997 | Chaudhuri et al. ................ 1/1 |
| 2008/0086444 | A1 | * | 4/2008 | Yu et al. ........................ 707/2 |
| 2010/0082599 | A1 | * | 4/2010 | Graefe et al. ................ 707/713 |
| 2012/0089595 | A1 | * | 4/2012 | Jaecksch ....................... 707/714 |

OTHER PUBLICATIONS

Akdere et al., "Learning-based query performance modeling and prediction" In ICDE, 2012, Apr. 2012. (12 pages).
Duggan et al., "Performance prediction for concurrent database workloads" SIGMOD 2011, Jun. 2011, pp. 337-348.
Ganapathi et al., "Predicting multiple metrics for queries: Better decisions enabled by machine learning" In ICDE 2009, Apr. 2009. (12 pages).

* cited by examiner

*Primary Examiner* — Usmaan Saeed
*Assistant Examiner* — Raquel Perez-Arroyo
(74) *Attorney, Agent, or Firm* — Joseph Kolodka

(57) ABSTRACT

There are provided a system and method for predicting query execution time in a database system. A cost model determination device determines a cost model of a database query optimizer for the database system. The cost model models costs of queries applied to the database system. A profiling device determines profiling queries for profiling input/output cost units and processor cost units relating to the database system, and profiles the cost units using the profiling queries to output profiled cost units. A calibrating device calibrates cost units in the cost model responsive to the profiled cost units to output calibrated cost units. A sampling re-estimator samples and re-estimates a cardinality estimation of a final query plan to output an updated cardinality estimation. A predictor applies the calibrated cost units and the updated cardinality estimation in the cost model to generate a prediction of an execution time of a given query.

20 Claims, 3 Drawing Sheets

PREDICTING QUERY EXECUTION TIME

RELATED APPLICATION INFORMATION

This application claims priority to provisional application Ser. No. 61/603,565 filed on Feb. 27, 2012, incorporated herein by reference.

BACKGROUND

1. Technical Field

The present invention relates to database querying, and more particularly to predicting query execution time.

2. Description of the Related Art

Predicting query execution time is an increasingly important problem, motivated by the current surge of providing databases as a service (DaaS) in the cloud. To a DaaS provider, query time prediction is crucial in many database management issues such as admission control, query scheduling, progress monitoring, and system sizing. However, given a database server hosting a relational database, is it difficult to predict the execution time of a search and query language (SQL) query before the query is executed.

Most existing solutions to this problem adopt statistical machine learning approaches to build predictive models. For example, in these machine-learning-based solutions, first a family of models (e.g., SVM regression, multiple linear regression, and KCCA) and a set of features (e.g., query plan structure and estimated cardinality) are handpicked. Second, a set of training data are collected by executing some sample queries. Then, the candidate models are tuned to fit the training data. Finally, the best tuned model (usually selected by using a separate set of validation data) is chosen as the solution. However, as is evident, the preceding solutions are not without deficiency. For example, while these approaches achieve some level of success, they suffer from several fundamental issues including poor performances on queries not seen during the training stage.

SUMMARY

These and other drawbacks and disadvantages of the prior art are addressed by the present principles, which are directed to predicting query execution time.

According to an aspect of the present principles, there is provided a system for predicting query execution time in a database system. The system includes a cost model determination device for determining a cost model of a database query optimizer for the database system. The cost model models costs of queries applied to the database system. The system further includes a profiling device for determining a group of profiling queries for profiling input/output cost units and processor cost units relating to the database system, and for profiling the input/output cost units and the processor cost units using one or more of the profiling queries in the group to output profiled input/output cost units and profiled processor cost units. The system also includes a calibrating device for calibrating cost units in the cost model responsive to the profiled input/output cost units and the profiled processor cost units to output calibrated cost units. The system additionally includes a sampling re-estimator for sampling and re-estimating a cardinality estimation of a final query plan to output an updated cardinality estimation. The system further includes a predictor for applying the calibrated cost units and the updated cardinality estimation in the cost model to generate a prediction of an execution time of a given query.

According to another aspect of the present principles, there is provided a method for predicting query execution time in a database system. The method includes determining a cost model of a database query optimizer for the database system. The cost model models costs of queries applied to the database system. The method further includes determining a group of profiling queries for profiling input/output cost units and processor cost units relating to the database system. The method also includes profiling the input/output cost units and the processor cost units using one or more of the profiling queries in the group to output profiled input/output cost units and profiled processor cost units. The method additionally includes calibrating cost units in the cost model responsive to the profiled input/output cost units and the profiled processor cost units to output calibrated cost units. The method further includes sampling and re-estimating a cardinality estimation of a final query plan to output an updated cardinality estimation. The method also includes applying the calibrated cost units and the updated cardinality estimation in the cost model to generate a prediction of an execution time of a given query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to predicting query execution time.

In an embodiment, the present principles predict query execution time by leveraging the cost models used by modern database query optimizers. In an embodiment, we provide systematic methods to correct errors in a query cost estimation model. In an embodiment, we provide methods to correct two major errors by calibrating the cost units and improving cardinality estimates. To calibrate the cost units, in an embodiment, we propose a family of light-weight but effective profiling queries to profile the underlying database system. To improve the cardinality estimates, in an embodiment, we propose to re-estimate the cost of the final best plan by leveraging a sampling-based approach with higher precision than those based on histograms.

Some of the many attendant advantages of the present principles over prior art solutions include, but are not limited to, the following: (1) higher quality: our prediction model has higher accuracy than the existing approaches; (2) higher generality: our prediction model can better handle previous unseen queries; and (3) less complexity: the present principles avoid the training stage in the machine learning solutions.

A significant feature of the present principles is that our prediction model faithfully follows the physical model of how modern database engines execute SQL queries. Due to this feature, the present principles do not treat the underlying database system as a black box and do not require sophisticated machine learning models to emulate a black box. As a result, our solution is intuitive, useful in providing additional insights about the database system, and can accurately predict the execution time of previously unseen queries. The details of the present principles are set forth in detail herein below.

Figure 1:
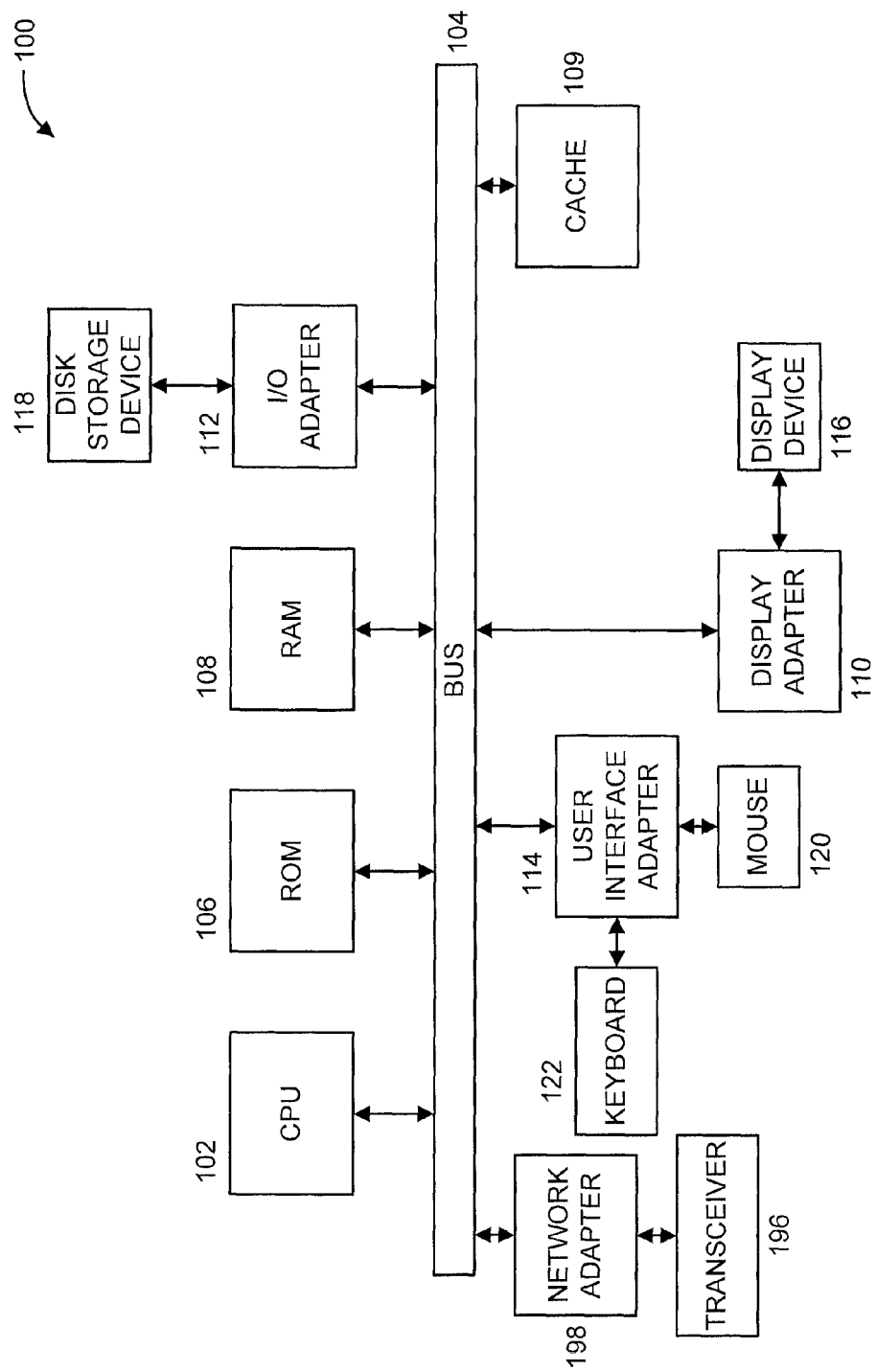
FIG. 1 is a block diagram illustrating an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 102 operatively coupled to other components via a system bus 104. A read only memory (ROM) 106, a random access memory (RAM) 108, a display adapter 110, an input/output (I/O) adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 214. The mouse 120 and keyboard 122 are used to input and output information to and from system 100.

A transceiver 196 is operatively coupled to system bus 104 by network adapter 198.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories (including solid-state memories, etc.), and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
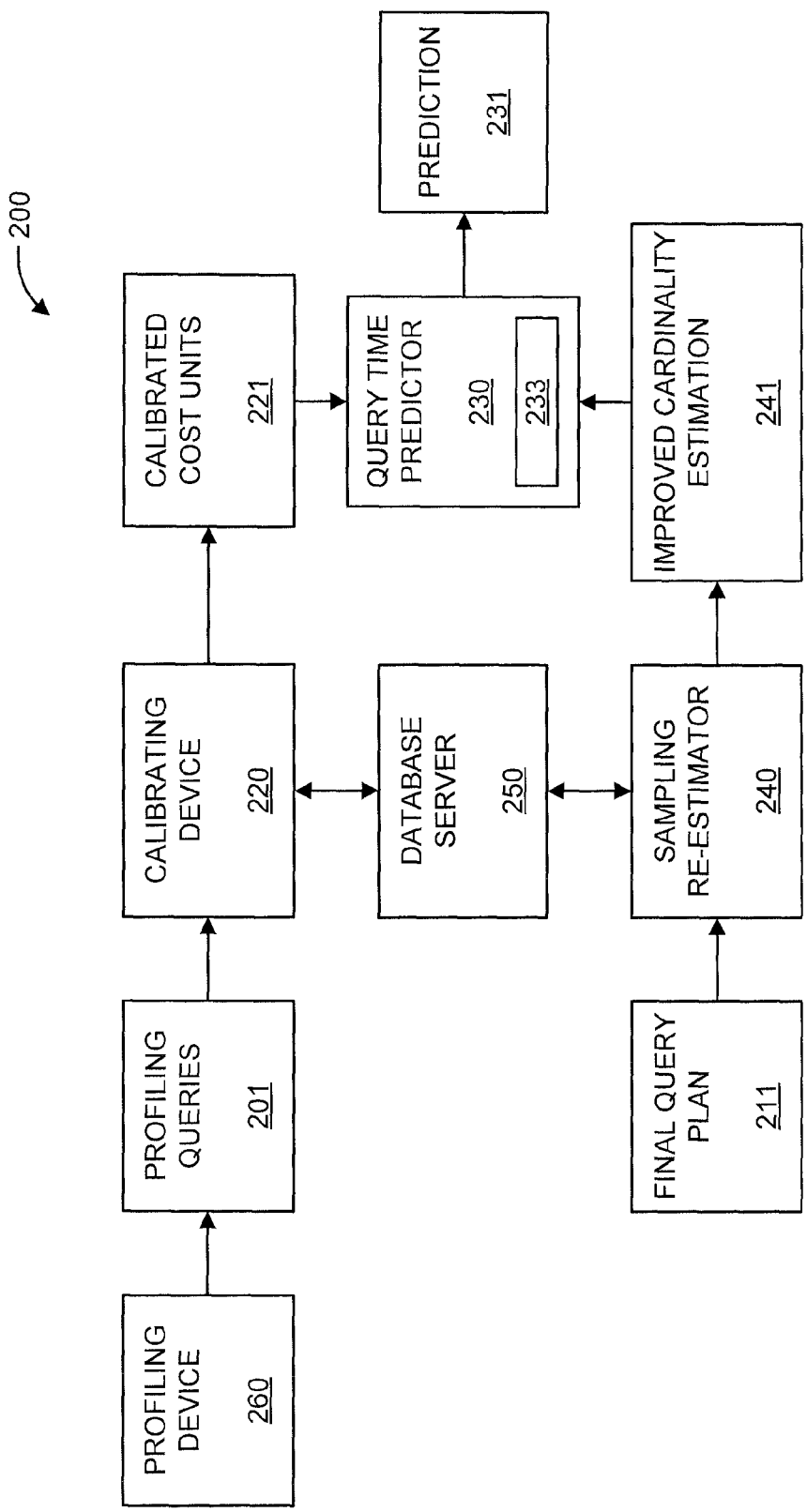
FIG. 2 shows a query optimizer 200 for predicting query execution time, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
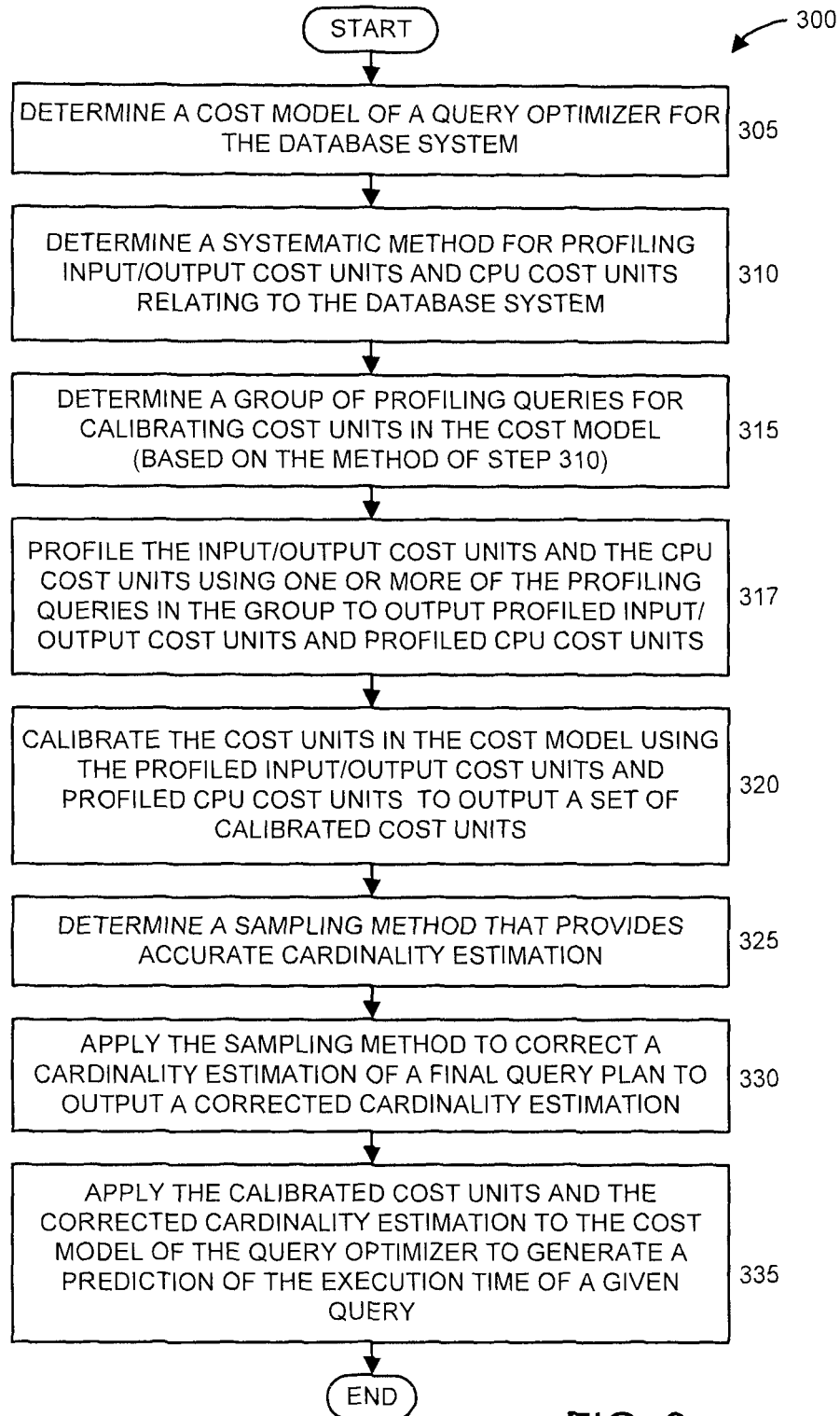
FIG. 3 shows an exemplary method 300 for predicting the execution time of a query in a database system by using the cost model of query optimizer, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows a query optimizer 200 for predicting query execution time, in accordance with an embodiment of the present principles.

The query optimizer 200 includes a calibrating device 220, a query time predictor 230, a sampling re-estimator 240, a database server 250, and a profiling device 260.

The sampling re-estimator 240 interfaces with the database server 250. The sampling re-estimator 240 inputs and samples a final query plan 211, and outputs an improved cardinality estimation 241. In an embodiment, the final query plan can be determined based on, but not limited to, one or more of the following criteria: database resources (e.g., memory buffer pool size, etc.); (2) statistics about the data (e.g., row number, size of data fields, etc.); and (3) information about the query (e.g., predicate selectivity, etc.). It is to be appreciated that the preceding list of criteria is merely illustrative and not exhaustive. In an embodiment, the final query plan 211 can be chosen from among a group of various query plans. Such selection can be based on the aforementioned criteria, or other criteria, as readily determined by one of ordinary skill in the art, given the teachings of the present principles provided herein.

The calibrating device 220 interfaces with the database server 250. The calibration device 220 inputs profiling queries 201, and outputs calibrated cost units 221. In an embodiment, the profiling queries are provided by the profiling device 260. In another embodiment, the profiling queries are received from an external source with respect to query optimizer 200.

The query time predictor 230 inputs the calibrated cost units 221 and the improved cardinality estimation 241, and outputs a prediction of the query time (hereinafter "prediction") 231. In an embodiment, the query time predictor 230 includes a cost model determination device 233 for receiving or generating a cost model to which the present principles will be applied. Thus, the cost model determination device 233 can itself generate a cost model or simply receive an already generated cost model (e.g., from an external source with respect to query optimizer 200) to which the present principles will be applied.

Thus, in an embodiment, our approach includes the following. First, we calibrate the CPU and input/output (I/O) cost units, to which the query optimizer 200 assigned some default values, so that they reflect the underlying hardware and database system (including the database server 250) in terms of actual execution time. Second, to predict the execution time of a query, once the query plan 211 for the query is determined, we improve the original cardinality estimation by using a sampling-based re-estimation to obtain an improved cardinality estimation (also interchangeably referred to herein as an "updated cardinality estimation") 241 from the sampling re-estimator 240. Finally, the cost model is leveraged in the query time predictor 230, by applying the calibrated cost units and corrected cardinality estimation to the cost model, to obtain the prediction 231 for the execution time of the given query.

Of course, the system 200 may also include other elements (not shown), as readily contemplated by one of skill in the art, as well as omit certain elements. These and other variations of the system 200 are readily contemplated by one of ordinary skill in the art given the teachings of the present principles provided herein.

FIG. 3 shows an exemplary method 300 for predicting the execution time of a query in a database system by using the cost model of query optimizer, in accordance with an embodiment of the present principles. We note that the term "determined" as used with respect to method 300 of FIG. 3 can mean receiving the item that is determined or determining the item, for example, by generating the item. Thus, as an example, a cost model (or a group of profiling queries, and so forth) can be received from an external source or from another device or step implicated by method 300 or can be determined on its own, which may involve generating the cost model in the first place or selecting the cost model from among a group of cost models.

At step 305, a cost model of a query optimizer for the database system is determined.

At step 310, a systematic method for profiling input/output (I/O) cost units and CPU cost units (the latter hereinafter interchangeably referred to as "processor cost units") relating to the database system is determined.

At step 315, a group of profiling queries for calibrating cost units in the cost model is determined (based on the method determined in step 310). In an embodiment, the group of profiling queries satisfies the properties of completeness, conciseness, and simplicity.

At step 317, the input/output (I/O) cost units and the CPU cost units are profiled using one or more of the profiling queries in the group of profiling queries (determined in step 315) to output profiled input/output (I/O) cost units and profiled CPU cost units.

At step 320, the cost units in the cost model are calibrated using the profiled input/output (I/O) cost units and profiled CPU cost units to output a set of calibrated cost units (that can be used in the query cost model for the purpose of query execution time estimation).

At step 325, a sampling method is determined that provides accurate cardinality estimation. In an embodiment, the sampling method includes bounds on errors. That is, the error of the sampling method is guaranteed to be within a given bound with enough number of samples. In an embodiment, step 325 can include determining an embedding method that embeds the sampling method in a query optimization. It is to be appreciated that by embedding the sampling module in the query optimizer, our method is lightweight. In addition, since the sampling is performed only once, for the final query plan that will be executed, the overhead is quite small. The sampling method can be considered a sampling and re-estimating method in that it is used to sample a cardinality estimation of a final query plan to re-estimate the same, that is, provide a corrected (updated) cardinality estimation in the next step.

At step 330, the sampling method is applied to correct a cardinality estimation of a final query plan to output a corrected cardinality estimation (that can be used in the query cost model for the purpose of query execution time estimation).

At step 335, the calibrated cost units and the corrected cardinality estimation are applied to the cost model of the query optimizer (from step 305) to generate a prediction of the execution time of a given query.

It is to be appreciated that at least both the calibrating approach and the sampling approach are new to the application of query time estimation. Compared to the prior art, which involve black-box machine learning methods, the present principles can be considered to involve a white-box approach in that it stays faithfully to the database engine. Thus, our prediction model follows how an SQL query is executed by the database engine, does not assume any sophisticated machine learning model, does not require training data, and can handle previously unseen queries without difficulties.

We now provide a general overview of the present principles, following by more detailed descriptions of various aspects of the present principles, in accordance with an embodiment of the present principles.

In comparison to the aforementioned prior art statistical machine learning based approaches, we propose an alternative approach that closely follows the underlying database engine's model to predict query execution time. We demonstrate that, by leveraging the existing cost models used by modern query optimizers, and by systematically correcting two types of errors along the way, we are able to predict execution time for SQL queries quite well. Our approach includes at least the following steps. First, we calibrate the CPU and I/O cost units, to which the query optimizer assigned some default values, so that the calibrated values reflect the underlying hardware and database system in terms of actual execution time. Second, to predict the execution time of a query, once the query plan for the query is determined by the optimizer, we improve the original cardinality estimation by using a sampling-based re-estimation. Since this costly re-estimation is done only once on the final query plan, the additional overhead introduced is practically reasonable for long-running queries. Our experimental evaluation on the TPC-H benchmark shows that our approach can outperform state-of-the-art approaches by a factor of 2 to 4 times, in terms of accuracy in prediction.

Thus, herein we propose an approach to query time prediction with the cost model of a query optimizer by addressing the gap between query cost and query execution time. A significant aspect of our framework is that we develop systematic methods to correct the errors in the query cost estimation model. We demonstrate that once two major errors are corrected, by calibrating the cost units and improving cardinality estimates, the existing cost models are actually very effective in predicting query execution time. To calibrate the cost units, we propose a family of lightweight but effective profiling queries to profile the underlying database system. To improve the cardinality estimates, we propose to re-estimate the cost of the final (best) plan by leveraging a sampling-based approach with higher overhead but also higher precision than those based on histograms. Notice that this re-estimation is only conducted once for the query whose execution time is to be predicted. We believe the additional overhead is affordable for long running queries in various applications such as admission control and scheduling.

A description will now be given of our framework, in accordance with an embodiment of the present principles.

One basic idea of our approach is to leverage the cost models used by modern query optimizers. We believe that these cost models capture the behaviors of the underlying database engine rather closely. Therefore we take them as the backbone of our framework. At the same time, we realize that these cost models cannot be directly used to predict query execution time, as has been shown by previous studies. In the following, we first investigate the cost model of a modern database, PostgreSQL. Then we identify the key errors that prevent the cost model from being directly used for predicting query execution time. Finally, we propose the architecture of our framework, whose implementation is described in detail herein after.

Regarding our framework, a description will now be given regarding cost models, in accordance with an embodiment of the present principles.

We first look into how the query optimizer of a particular database system models the cost of a query plan. Herein after, we focus our discussion on PostgreSQL's cost models. Other modern database systems, although differing in exact details, use models similar to the one described here. Thus, it is to be appreciated that the following discussion involving PostgreSQL's cost models is merely for illustrative purposes and, thus, other cost models can also be used in accordance with the teachings of the present principles, while maintaining the spirit of the present principles.

The cost of each operator estimated by PostgreSQL's optimizer can be expressed in terms of a vector of five parameters (referred to as cost units): $c=(c_s; c_r; c_t; c_i; c_o)^T|$, defined as follows:

(1) $c_s$: seq_page_cost, the I/O cost to sequentially scan a page.
(2) $c_r$: random_page_cost, the I/O cost to randomly access a page.
(3) $c_t$: cpu_tuple_cost, the CPU cost to process a tuple.
(4) $c_i$: cpu_index_tuple_cost, the CPU cost to process a tuple via index access.
(5) $c_o$: cpu_operator_cost, the CPU cost to perform an operation such as hash or aggregation.

The cost $C_O$ of an operator O in a query plan is then represented as a linear combination of $c_s$, $c_r$, $c_t$, $c_i$, and $c_o$ as follows:

$$C_O = n^T c = n_s \cdot c_s + n_r \cdot c_r + n_t \cdot c_t + n_i \cdot c_i + n_o \cdot c_o. \quad (1)$$

The values $n=(n_s; n_r; n_t; n_i; n_o)^T$ here can be intuitively interpreted as the number of pages sequentially scanned, the number of pages randomly accessed, and so forth, involved in operator O. The total estimated cost of a query plan is then a combination of the costs of individual operators in the query plan, with execution details such as blocking/non-blocking operators taken into consideration.

Regarding our framework, a description will now be given regarding challenges in directly using the cost model, in accordance with an embodiment of the present principles.

There are several previous attempts that try to use the cost model described by Equation (1) for the purpose of predicting query execution time. For example, in a baseline approach, $C_O$ is mapped to the query execution time with simple linear regression by introducing a shifting factor and a scaling factor. However, the results reported show that the error in prediction is often quite large (e.g. 120% relative error on average).

We believe there are two main obstacles that prevent one from directly using Equation (1) for estimating query execution time, namely errors in cost units (i.e., c) and errors in the cardinality estimation (i.e., n). We discuss these two errors in the following.

Regarding challenges in using the cost model, a description will now be given regarding errors in cost units, in accordance with an embodiment of the present principles.

The optimizer relies on the five cost units to derive the cost by using Equation (1). However, while the semantics of these cost units are clear, the default values chosen by the query optimizer are rather arbitrary. In PostgreSQL, by default, $c_s=1:0$, $c_r=4:0$, $c_t=0:01$, $c_i=0:005$, and $c_o=0:0025$. The cost is thus interpreted in the units of sequential page I/O cost (since $c_s=1:0$). Directly using linear regression on them then means admitting the correctness of these ratios in terms of execution time (e.g., random access of a page takes four times as long as sequential scan of a page, in terms of wall-clock time), which is usually not the case in practice.

Regarding challenges in using the cost model, a description will now be given regarding errors in cardinality estimation, in accordance with an embodiment of the present principles.

The cost model of the query optimizer relies on the cardinality (i.e., the number of tuples) estimates made for each relational operator. For example, the logic flow leveraged by cost models in PostgreSQL can be summarized as the following five steps: (1) estimate the input/output cardinality; (2) compute CPU cost based on cardinality estimates; (3) estimate the number of accessed pages according to the cardinality estimates; (4) compute I/O cost based on estimates of accessed pages; and (5) compute the total cost as the sum of CPU and I/O cost.

Unfortunately, cardinality estimation is a very difficult problem that has been studied for many decades. Almost all current query optimizers simply adopt approaches based on histograms. The main reason for this decision is the consideration of additional overhead. Since cardinality estimates should be made for every intermediate query plan considered by the optimizer during the query optimization procedure, methods with a bit higher overhead are excluded. Histograms, after they are constructed, can be accessed with very little overhead compared to other approaches (e.g., sampling-based approaches), and therefore are favored by query optimizer implementers. In addition to the overhead of eliminating these errors (e.g., by using real time feedback), another main reason of tolerating these errors is that query optimizers are often rather robust to them. Recent work sheds some light on the reasons for such robustness: they demonstrate that query plans obtained by using cardinality with errors (more specifically, by using optimal plans in neighboring regions of the parameter space) only degrade the total query cost slightly.

But obviously, errors in cardinality estimation will directly affect the accuracy of query execution time prediction, if we choose to leverage the cost model described by Equation (1).

Regarding our framework, a description will now be given regarding the architecture of our framework, in accordance with an embodiment of the present principles.

From the above discussion, we can see that the errors in c and n will prevent us from leveraging $C_O=n^T c$ to predict query execution time. However, instead of giving up on the cost model, we propose a framework, illustrated in FIG. 2, in which the errors in c and n are systematically corrected. Basically, the errors in c reflect an inaccurate view of on the underlying hardware and database system, while the errors in n reflect an inaccurate view on the query whose execution time is to be predicted. In our framework, to correct the bias in c, instead of using their default values assigned by the query optimizer, we calibrate them by running a family of lightweight profiling queries on the real hardware and database system. To correct the errors in n, once the query plan is finalized by the query optimizer, we re-estimate the cardinality of the query plan by using a sampling-based approach. The detailed implementation of these two components is given herein after.

A description will now be given regarding calibrating cost units, in accordance with an embodiment of the present principles.

We temporarily assume that n is accurate, an assumption that we will address herein after. If we replace the default value of each cost unit by its time units, then the result computed by Equation (1) is the prediction for the actual execution time of the operator instead of the estimated cost based on the default cost units. The question is then how to measure each of the time units.

Regarding calibrating cost units, a description will now be given regarding some guiding principles, in accordance with an embodiment of the present principles.

Calibrating optimizer parameters mainly falls into two different approaches, namely direct measurement; and use of a calibration query.

Regarding direct measurement, the parameters are measured directly at the hardware level. For example, in one approach, the I/O weight was estimated as the sum of the average seek, latency, and transfer times for one 4 KB page of data, while the CPU weight was estimated by the inverse of the MIP rate, divided by 1000 MIPS/msec.

Regarding use of the calibration query, the parameters are measured via a set of calibration queries. For each optimizer parameter, one designs some particular query that isolates this parameter from the others.

Direct Measurement can usually obtain very accurate results. However, it requires the optimizer cost model to be designed in such a way that all the parameters are directly measurable. For example, in one prior art optimizer, the cost model was a weighted sum over CPU, I/O and network message passing cost, all of which are directly measurable via hardware testing. However, for modern optimizers, cost models usually involve finer-granularity parameters, such as cpu_index_tuple_cost and cpu_operator_cost defined in PostgreSQL, which cannot be directly measured. Therefore, we next focus our discussion on the second option by leveraging calibration queries.

Ideally, we wish to have one calibration query for one parameter. However, it is not always possible. For example, there is no SQL query which involves only cpu_operator_cost but no cpu_tuple_cost. A natural generalization is then to use k calibration queries for k parameters. The following example illustrates this idea.

Example 1

Calibration Query

Suppose R is some relation and has been loaded into memory. We can use the following two calibration queries to obtain the parameters cpu_tuple_cost and cpu_operator_cost:

Q1: SELECT * FROM R
Q2: SELECT COUNT(*) FROM R

Since R is loaded into memory, there is no I/O cost for both Q1 and Q2. Q1 only involves the parameter cpu_tuple_cost, and Q2 involves both cpu_tuple_cost and cpu_operator_cost. Suppose the execution time of Q1 and Q2 are $t_1$ and $t_2$, respectively. Since the overhead involving cpu_tuple_cost for Q1 and Q2 are the same, we can then infer cpu_operator_cost with respect to the execution time $t_2 - t_1$.

Specifically, let the number of tuples processed be $n_t$, and the number of CPU operations be $n_o$, as in Equation (1). Suppose that $T_t$ is the time for the CPU to process one tuple, and $T_o$ is the time for one CPU operation. We then have the following:

$$t_1 = T_t \cdot n_t$$

$$t_2 = T_t \cdot n_t + T_o \cdot n_o.$$

Solving these two equations gives us the values of $T_t$ and $T_o$, which is our calibration of $c_t$ and $c_o$ in Equation (1) on the given hardware and database configuration.

In general, with a set of calibration queries Q, we first estimate $n_i$ for each $q_i \in Q$ and then measure its execution time $t_i$. With $N = (n_1 \ldots n_k)^T$ and $t = (t_1 \ldots, t_k)^T$ we can solve the following equation for c as follows:

$$Nc = t \qquad (2)$$

The next question is then, given a set of optimizer cost units c, how to design a set of calibration queries Q. Clearly, it depends on the specific form of the cost model and may require expertise from optimizer designers. However, we argue that a set of principles are generally applicable as follows:

Completeness: Each cost unit in c should be covered by at least one calibration query $q \in Q$.

Conciseness: Each query $q \in Q$ is necessary to guarantee completeness. In other words, any subset $Q' \subset Q$ is not complete.

Simplicity: Each query $q \in Q$ should be as simple as possible when Q is both complete and concise.

The requirement of completeness directly follows from the motivation of using calibration queries. Conciseness is also natural. Since the possible number of SQL queries on a given database is infinite, we should restrict our attention to minimal complete subsets. This is because introducing more queries is redundant for our purpose of calibration and it only increases the overhead spent on calibration. However, there is still an infinite number of Q's that are both complete and concise. Regarding our purpose of measuring the parameters via a set of equations, simpler queries are preferred, since the coefficients like $n_t$ and $n_o$ in Example 1 are estimated by the cost model. Although we can correct these estimates via a general framework by improving the cardinality estimates (as discussed herein after), some uncertainty still exists and cannot be improved. For example, in PostgreSQL, the number of CPU operations involved in sorting n tuples is roughly estimated as n log n. Even if we can make n correct, this estimate of CPU operations is still inaccurate. Since cost estimation is performed in a bottom-up manner by traversing the query plan, the more complicated the query, the more likely the inaccurate estimates will propagate upwards. Therefore, simpler queries should be favored.

Regarding calibrating cost units, a description will now be given regarding an implementation, in accordance with an embodiment of the present principles.

Based on these principles, we design the calibration queries for PostgreSQL optimizer parameters in the following approach. We choose queries $q_i$ for Q by introducing individual cost units one by one as follows:

cpu_tuple_cost: We use query $q_1$:
SELECT * FROM R
as the calibration query. The relation R is first loaded into memory, and hence there is no I/O cost involved: $n_1 = (0, 0, n_{t1}, 0, 0)$.

cpu_operator_cost: We use query $q_2$:
SELECT COUNT(*) FROM R
as another calibration query. We then use the method illustrated in Example 1. Again, R is memory resident: $n_2 = (0,0, n_{t2}, 0, n_{o2})$ and $n_{t2} = n_{t1}$.

cpu_index_tuple_cost: We use query $q_3$:
SELECT * FROM R WHERE R.A<a
by picking some proper a, so that the query plan will be an index scan, not a sequential scan. This query involves cpu_tuple_cost, cpu_index_tuple_cost, and cpu_operator_cost. Once again, R is memory resident: $n_3 = (0, 0, n_{t3}, n_{i3}, n_{o3})$.

seq_page_cost: We use query $q_4$:
SELECT * FROM R
as the calibration query. This query will be executed in one single pass of sequential scan, and the cost model only involves overhead in terms of seq_page_cost and cpu_tuple_cost. To make the calibration more accurate, R is intentionally made to be big so that I/O cost is dominant and hence CPU cost is almost negligible: $n_4 = (n_{s4}, 0, nt_4, 0, 0)$.

rand_page_cost: We use query $q_5$:
SELECT * FROM R where R.A<a
as the calibration query. Here A is some attribute of the relation R on which an unclustered index is built. The values of A are uniformly generated, and we pick a so that the query is executed via an index scan instead of sequential scan. Ideally, we wish that the qualified tuples were completely randomly distributed so that we can isolate the parameter rand_page_cost. However, in practice, pure random access is difficult to achieve, since the executor will first determine the pages that need to be accessed based on the qualified tuples before it actually access the pages. In this sense, local sequential accesses are unavoidable, and the query plan involves more or less overhead in terms of seq_page_cost. In fact, a typical query plan of this query will include all five parameters. Again, to make the calibration more accurate, R is intentionally made big so that I/O cost is dominant. $n_5 = (n_{s5}, n_{r5}, n_{t5}, n_{i5}, n_{o5})$.

Notice that $n_i$ can be estimated relatively accurately due to simplicity of $q_i$ and the fact that the matrix N including the above $n\_1$ to $n\_5$ is triangular, resulting in a very simple procedure to estimate cost units.

To make this approach more robust, our implementation uses multiple queries for each $q_i$ and finds the best-fitting of c. This is done by picking different relations R and different values for the a in the predicate R.A<a.

A description will now be given regarding improving the cardinality estimation, in accordance with an embodiment of the present principles.

We first illustrate how the optimizer obtains n for a given query plan by anatomizing the cost models of some typical operators of PostgreSQL. We then propose to re-estimate the cardinality (and hence the cost) of the final plan from the optimizer, by using a classic sampling-based approach. Finally, we briefly outline the framework of the algorithm and describe our current and ongoing implementation.

Regarding improving the cardinality estimation, a description will now be given regarding the optimizer's estimation of n, in accordance with an embodiment of the present principles.

The optimizer estimates the query execution cost by aggregating the cost estimates of the operators in the query plan. To distinguish blocking and non-blocking operators, this cost model comprises of the start_cost and total_cost of each operator: start_cost (sc for short) is the cost before the operator can produce the first output tuple; while total_cost (tc for short) is the cost after the operator generates all of its output tuples. Note that the cost of an operator includes the cost of all its child operators. Both sc and tc can be factorized into n, and the query execution cost (tc of the root operator) is given in the form of $n^T c$. We now analyze how n is derived by anatomizing the cost models of the (in-memory) sort, materialize, and hash aggregate operators in PostgreSQL. In the following illustration, run_cost (rc for short) is defined as rc=tc−sc, and $N_t$ is the (estimated) number of input tuples into the operator. Observe that the costs are given as linear combinations of c.

Example 2

In-Memory Sort

Quick sort will be used if the optimizer estimates that the input to the sort operator can be completely held in memory. The sc and rc are estimated as follows:

$sc = 2 \cdot c_o \cdot N_t \cdot \log N_t + tc$ of child operator, $rc = c_o \cdot N_t$.

Example 3

Materialize

The materialize operator stores intermediate query processing results. Its sc and rc are estimated as follows:

$sc = sc$ of child operator, $rc = 2 \cdot c_o \cdot N_t$.

Suppose $N_b = N_t \cdot W_t$, where $W_t$ is the width of the tuple t, and $N_b$ is the total number of input bytes to be materialized. If $N_b$ is bigger than the size of working memory, the materialize operator has to spill the input onto disk. In this case, rc is modified as follows:

$$rc = 2 \cdot c_o \cdot N_t + c_s \cdot \frac{N_b}{B}$$

where B is the size of a disk block.

Example 4

Hash Aggregate

The hash aggregate operator is used to compute the aggregate functions on groups (via GROUP BY) when the input tuples are not sorted. Let $N_G$ and $N_A$ be the number of groups and aggregate functions involved in the computation. sc and rc are estimated as follows:

$sc = c_o \cdot N_t \cdot (N_G + N_A) + tc$ of child operator, $rc = c_o \cdot N_G \cdot N_A + c_t \cdot N_G$.

Notice that the key uncertainty of n comes from the estimated input cardinality $N_t$ in these examples. Hence, our main task is to calibrate the input cardinality $N_t$.

Regarding improving the cardinality estimation, a description will now be given regarding cardinality re-estimation, in accordance with an embodiment of the present principles.

Since the accuracy of cost estimates highly depends on the accuracy of cardinality estimates, for our purpose of leveraging cost models to predict query execution time, it is necessary to get relatively higher accuracy on cardinality estimation. Our idea is to re-estimate the cardinality (and hence the cost) of the final query plan resulting from the optimization phase. Clearly, this will increase the overhead of the optimization phase. However, the key insight here is that the re-estimation procedure only needs to be performed once for the final (best) plan produced by the optimizer. In other words, the estimation refinement is done once per query, not once per intermediate sub-plan. We argue that, if prediction is really important, it is reasonable to spend some additional overhead in improving the cardinality estimates. This is especially true for those complicated queries which take a long time to execute.

In this sense, cardinality estimation techniques that are prohibited in query optimizer implementation due to their relatively higher overhead can now be attempted.

Regarding improving the cardinality estimation, a description will now be given regarding the sampling algorithm, in accordance with an embodiment of the present principles.

In principle, any approaches that can improve cardinality estimation can be applied. We propose to use a classic sampling-based approach for: (i) its theoretical guarantee to the accuracy of estimation on most of the common queries; and (ii) its verified efficiency in practice. We next give a brief overview of the algorithm and describe our implementation.

The central idea of the algorithm is to partition the query result. To estimate the size of the query, the answer set of the query is conceptually partitioned into a number of disjoint subsets. The algorithm then repeatedly randomly picks one subset, computes its size, and then estimates the size of the answer set based on these samples.

Algorithm 1 outlines the algorithm that gives an estimate $\tilde{A}$ of the query size |q| for given q. Here, b is an upper bound on the size of a partition, n is the number of partitions in total, and d and e are two controllable parameters that specify the required accuracy on estimation. $0<p<1$ is the confidence on the estimation, and $k_1$ and $k_2$ are constants only dependent on p.

Regarding improving the cardinality estimation, a description will now be given regarding an implementation, in accordance with an embodiment of the present principles.

Because sampling requires repeated accesses to the database, efficient implementation is necessary to make it practical. Another possible improvement is to use block-level sampling instead of tuple-level sampling as in Algorithm 1, which can reduce the number of I/O's involved during sampling. This requires the sampling algorithm to be implemented inside the database system. However, we are not aware of any existing DBMS with such functionality.

We currently provide an outside-DBMS implementation of Algorithm 1. The implementation leverages the built-in function random( ) of PostgreSQL, as illustrated by the following example.

Example 5

Sampling in PostgreSQL

Given a query q of the form SELECT . . . FROM . . . WHERE . . . , we can obtain a sample tuple from its answer set by modifying it as follows:
SELECT . . . FROM . . . WHERE . . .
ORDER BY random( ) LIMIT 1.

A naive implementation could be that, for each query, we can first rewrite it as the way described in Example 5, and then repeatedly run the modified query to take samples. This implementation, however, is very inefficient, since the modified query is evaluated in PostgreSQL by first executing the original query and then randomly taking a sample from the answer set. Therefore, each time we obtain a sample, we have to run the original query once. We overcome this barrier by noticing that the second condition $m<k_{2e}^2$ in the while loop of Algorithm 1 only depends on the number of samples taken (i.e., m), and does not depend on the particular sample size s. Since the partitions are actually logical, by discarding the first condition $s<k_1bd(d+1)$ in the while loop, we are able to decouple the sampling phase with the actual execution of these sample queries, as illustrated in the following example.

Example 6

Decoupling

Consider a natural join query $q=R \bowtie S$. The answer set can be partitioned as follows. For each tuple r∈R, the partition is all tuples t such that t is generated by joining r with some tuple of S. Therefore, we can first sample (with-replacement) a subset of R-tuples, store it in a temporary table $R_{sample}$, and then perform a single join query $q'=R_{sample} \bowtie S$. The size q can then be estimated as $n|q'|/m$, where $|q'|$ is the size of q'.

Comparing with the naive implementation, this decoupling approach usually requires taking more samples (i.e., $k_2e^2$), and involves the overhead of materializing the samples. However, the samples can be taken via a single SQL query (the same as in Example 5 except changing the number in LIMIT from 1 to $k_2e^2$). This dramatically improves the efficiency of the sampling because, for an outside-DBMS implementation, the bottleneck is the number of SQL queries that need to be executed. On the other hand, we set e=10 in our implementation, which means the estimated cardinality should be within 10% error of the actual value. Therefore, the number of samples is usually around several hundreds, and hence the materialization overhead is affordable in practice.

| Algorithm 1: Cardinality estimation via sampling |
|---|
| Input: q, a SQL query |
| Output: Ã, estimated size of q |
| 1  s ← 0; |
| 2  m ← 0; |
| 3  while $s < k_1bd(d+1)$ and $m < k_2e^2$ do |
| 4   \| s ← s + RandomSample(q) |
| 5   \| m ← m + 1 |
| 6  end |
| 7  return Ã = ns/m; |

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for predicting query execution time in a database system, comprising:

a processor, a cost model determination device for determining a cost model of a database query optimizer for the database system, the cost model for modeling costs of queries applied to the database system, wherein the optimizer estimates a cost of each operator as a vector of cost units $c=(C_s; C_r; C_t; C_i; C_o)^T|$, wherein $c_s$: seq_page_cost, I/O cost to sequentially scan a page;
$c_r$: random_page_cost, I/O cost to randomly access a page;
$c_t$: cpu_tuple_cost, CPU cost to process a tuple;
$c_i$: cpu_index_tuple_cost, CPU cost to process a tuple via index access; or
$c_o$: cpu_operator_cost, CPU cost to perform an operation, and where a cost $C_O$ of an operator O in a query plan is represented as a linear combination as:

$$C_O = n^T c = n_s \cdot c_s + n_r \cdot c_r + n_t \cdot c_t + n_i \cdot c_i + n_o \cdot c_o;$$

a profiling device for determining a group of profiling queries for profiling input/output cost units and processor cost units relating to the database system, and for profiling the input/output cost units and the processor cost units using one or more of the profiling queries in the group to output profiled input/output cost units and profiled processor cost units;

a calibrating device for calibrating cost units in the cost model responsive to the profiled input/output cost units and the profiled processor cost units to output calibrated cost units;

a sampling re-estimator for sampling and re-estimating a cardinality estimation of a final query plan to output an updated cardinality estimation; and a predictor for applying the calibrated cost units and the updated cardinality estimation in the cost model to generate a prediction of an execution time of a given query.

2. The system of claim 1, wherein the given query, for which the prediction of the execution time thereof is generated, is previously unseen by the database system.

3. The system of claim 1, wherein the input/output cost units and the processor cost units are profiled separately to output the profiled input/output cost units and the profiled processor cost units.

4. The system of claim 1, wherein an error of the updated cardinality estimation providing by the sampling re-estimator is bounded.

5. The system of claim 1, wherein the given query is a structured query language query.

6. The system of claim 1, wherein the input/output cost units and the processor cost units that are profiled relate to one or more specific hardware and database configurations of the database system.

7. The system of claim 1, wherein the sampling re-estimator is configured to sample the cardinality estimation of the final query plan to output the updated cardinality estimation responsive to one or more specific hardware and database configurations of the database system.

8. The system of claim 1, wherein values of the cost units in the cost model that are calibrated by the calibrating device comprise default values.

9. The system of claim 1, wherein the sampling re-estimator estimates a query size of a particular query by conceptually partitioning an answer set of the particular query into a number of disjoint subsets, randomly and repeatedly selecting a respective one of the disjoint subsets to compute a respective subset size therefor, and generating an estimate of an answer set size based on the respective subset size of each of the disjoint subsets, and wherein the estimate of the answer set size is used to determine the updated cardinality estimation.

10. The system of claim 1, wherein the sampling re-estimator decouples a query answer set tuple sampling phase from an execution of corresponding sample queries, to determine and output the updated cardinality estimation.

11. A method for predicting query execution time in a database system, comprising:

determining a cost model of a database query optimizer for the database system, the cost model for modeling costs of queries applied to the database system, wherein the optimizer estimates a cost of each operator as a vector of cost units $c=(c_s; c_r; c_t; c_i; c_o)^T|$, wherein $c_s$: seq_page_cost, I/O cost to sequentially scan a page;
$c_r$: random_page_cost, I/O cost to randomly access a page;
$c_t$: cpu_tuple_cost, CPU cost to process a tuple;
$c_i$: cpu_index_tuple_cost, CPU cost to process a tuple via index access; or
$c_o$: cpu_operator_cost, CPU cost to perform an operation, and where a cost $C_O$ of an operator O in a query plan is represented as a linear combination as:

$$C_O = n^T c = n_s \cdot c_s + n_r \cdot c_r + n_t \cdot c_t + n_i \cdot c_i + n_o \cdot c_o;$$

determining a group of profiling queries for profiling input/output cost units and processor cost units relating to the database system;

profiling the input/output cost units and the processor cost units using one or more of the profiling queries in the group to output profiled input/output cost units and profiled processor cost units;

calibrating cost units in the cost model responsive to the profiled input/output cost units and the profiled processor cost units to output calibrated cost units;

sampling and re-estimating a cardinality estimation of a final query plan to output an updated cardinality estimation; and applying the calibrated cost units and the updated cardinality estimation in the cost model to generate a prediction of an execution time of a given query.

12. The method of claim 11, wherein the given query, for which the prediction of the execution time thereof is generated, is previously unseen by the database system.

13. The method of claim 11, wherein the input/output cost units and the processor cost units are profiled separately to output the profiled input/output cost units and the profiled processor cost units.

14. The method of claim 11, wherein an error of the updated cardinality estimation providing by the sampling and re-estimating step is bounded.

15. The method of claim 11, wherein the given query is a structured query language query.

16. The method of claim 11, wherein the input/output cost units and the processor cost units that are profiled relate to one or more specific hardware and database configurations of the database system.

17. The method of claim 11, wherein the sampling and re-estimating step is configured to sample the cardinality estimation of the final query plan to output the updated cardinality estimation responsive to one or more specific hardware and database configurations of the database system.

18. The method of claim 11, wherein values of the cost units in the cost model that are calibrated by the calibrating step comprise default values.

19. The method of claim 11, wherein the sampling and re-estimating step estimates a query size of a particular query by conceptually partitioning an answer set of the particular query into a number of disjoint subsets, randomly and repeatedly selecting a respective one of the disjoint subsets to compute a respective subset size therefor, and generating an estimate of an answer set size based on the respective subset size of each of the disjoint subsets, and wherein the estimate of the answer set size is used to determine the updated cardinality estimation.

20. The method of claim 11, wherein the sampling and re-estimating step decouples a query answer set tuple sampling phase from an execution of corresponding sample queries, to determine and output the updated cardinality estimation.

\* \* \* \* \*